United States Patent
Fujiwara

(10) Patent No.: US 6,762,850 B2
(45) Date of Patent: *Jul. 13, 2004

(54) FACSIMILE APPARATUS

(75) Inventor: Yasushi Fujiwara, Sagamihara (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/106,518

(22) Filed: Jun. 29, 1998

(65) Prior Publication Data

US 2001/0013946 A1 Aug. 16, 2001

(30) Foreign Application Priority Data

Jul. 15, 1997 (JP) .............................. 9-189590

(51) Int. Cl.[7] .................................. H04N 1/32
(52) U.S. Cl. ...................... 358/1.15; 358/468; 358/444
(58) Field of Search ................................ 358/400, 468, 358/443, 444, 442, 405, 1.15

(56) References Cited

U.S. PATENT DOCUMENTS

| | | | | |
|---|---|---|---|---|
| 5,065,254 A | * | 11/1991 | Hishida ...................... 358/400 |
| 5,150,400 A | * | 9/1992 | Ukegawa ..................... 379/93 |
| 5,293,253 A | * | 3/1994 | Kida et al. .................. 358/440 |
| 5,884,103 A | * | 3/1999 | Terho et al. ................ 395/892 |
| 5,907,409 A | * | 5/1999 | Sugawara et al. .......... 358/406 |
| 5,995,242 A | * | 11/1999 | Izumisawa et al. ......... 358/434 |
| 6,005,677 A | * | 12/1999 | Suzuki ...................... 358/422 |

FOREIGN PATENT DOCUMENTS

| | | | |
|---|---|---|---|
| JP | 1221060 A | 9/1989 | |
| JP | 7250199 | 9/1995 | ............ H04N/1/00 |
| JP | 7321991 | 12/1995 | |

OTHER PUBLICATIONS

Official Action dated Jun. 10, 2003 in connection with corresponding German Patent Application No. 198 30 363.7–31 (German language document and English language translation thereof).

* cited by examiner

Primary Examiner—Thomas D. Lee
(74) Attorney, Agent, or Firm—Cooper & Dunham LLP

(57) ABSTRACT

A facsimile apparatus connected to a data processing equipment having a facsimile application includes, a communication control unit having a modem for communicating to a remote terminal by communication line, a memory for storing data received from said remote terminal, an interface device connected to said data processing equipment for converting input and output signals to communicate to said data processing equipment, a controller for communicating with said data processing equipment by AT command and for converting the stored data, and wherein said controller sends the data to said data processing equipment through said interface device by AT command after converting the stored data. The controller converts a character code of a transmitter discrimination signal which is not recognized by the facsimile application to a predetermined code which is defined in group 3 standard procedure.

67 Claims, 6 Drawing Sheets

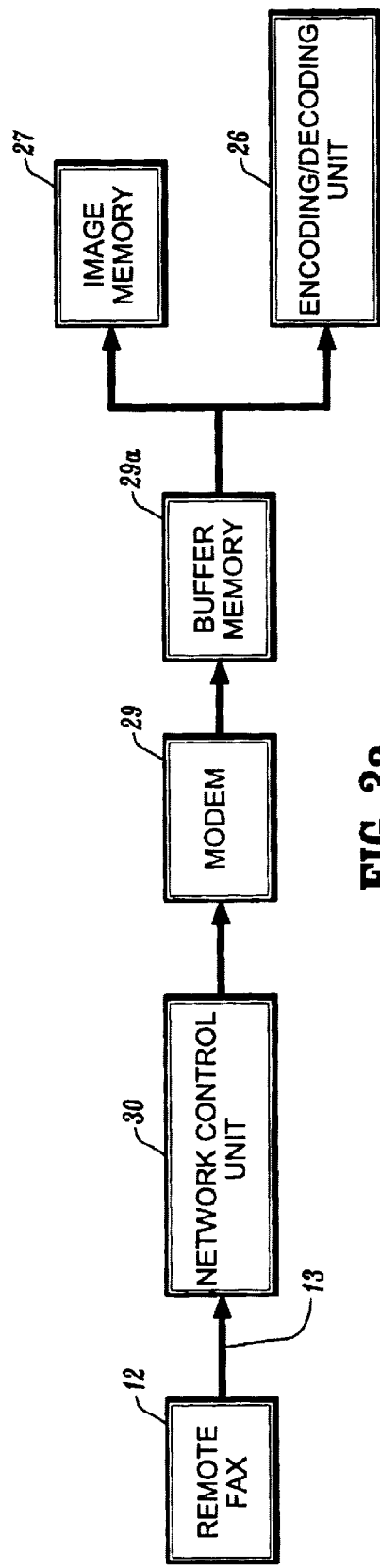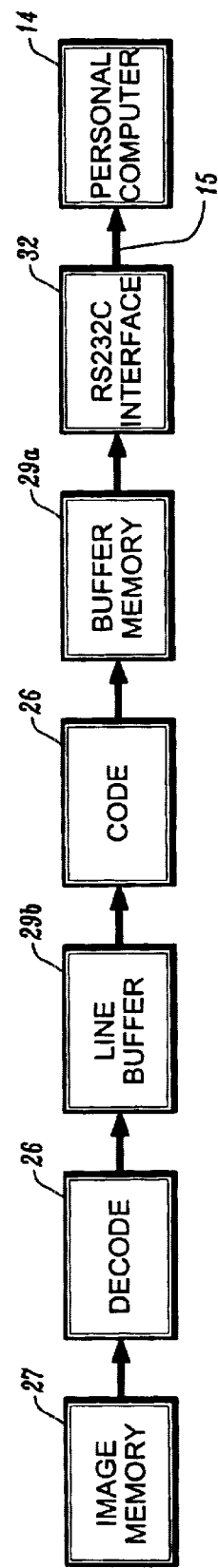
FIG. 3a
FIG. 3b

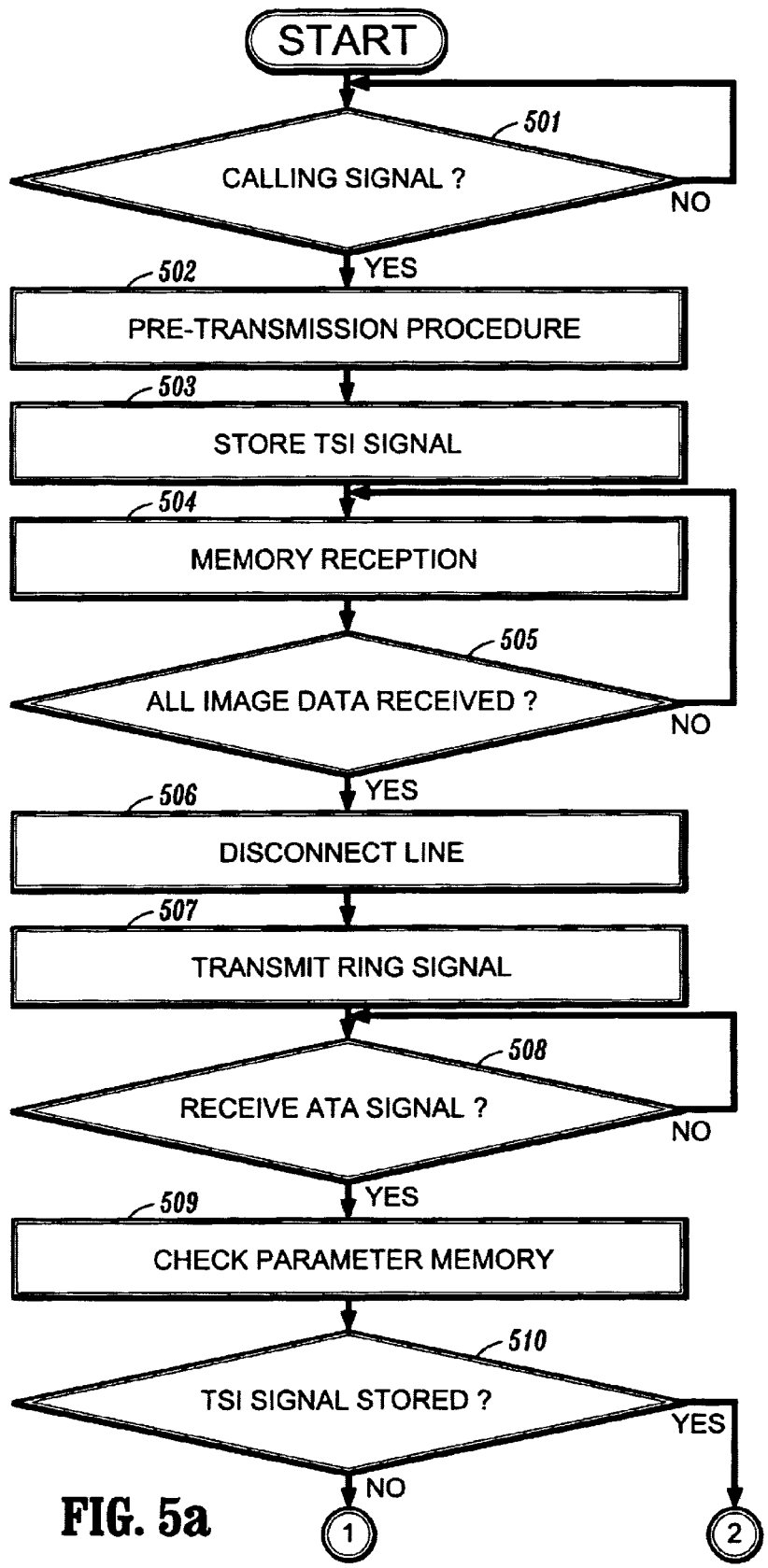

FACSIMILE APPARATUS

BACKGROUND OF THE INVENTION

1. Field of the Invention

This invention relates to a facsimile apparatus and, more particularly, to a facsimile apparatus for communicating with data processing equipment by AT command.

2. Description of the Related Art

A conventional facsimile apparatus such as that disclosed in Japanese Laid-Open Patent Application No. 7-250199 has a RS232C interface and is connected to a personal computer through the RS232C interface. The personal computer has a communications software application for facsimile transmission and reception. The facsimile application uses an AT command and controls a modem of the facsimile apparatus to communicate with a remote terminal by AT command.

The facsimile application is delivered by software companies and the user or manufacturer of the personal computer installs it into their personal computer. Accordingly, it is difficult, if not impossible for the software companies to know the performance specifications of the facsimile apparatus that will be used in conjunction with their facsimile application, before they launch their products.

Accordingly, the software companies must produce their products for general purpose use. For this reason, their products are equipped with the group 3 standard recommended by ITU-T, but do not completely support non-standard functions.

For the reasons mentioned above, the personal computer generally communicates with the remote terminal by group 3 standard procedure.

If the facsimile apparatus has sufficient memory, it is possible to communicate with the remote terminal by non-standard procedure because the devices are able to communicate independently of the function of the facsimile application.

In this case, the facsimile apparatus stores the data received from the remote terminal in the memory and transmits the stored data to the personal computer after the end of the communication with the remote terminal, by AT command based on group 3 standard procedure.

However, when the facsimile apparatus communicates with the remote terminal by non-standard procedure, there is a possibility of losing some data when the facsimile apparatus transmits the stored data to the personal computer.

For example, the group 3 standard defines the numeral [0~9], space, and plus sign for the TSI (Transmitting Station Identification) signal. However, in most cases, an alphabet character is often used in the TSI signal under non-standard procedure. In addition, each facsimile manufacturer has their own character code system for the TSI signal. So, when the alphabet character is used for the TSI signal in communication between the facsimile apparatus and remote terminal, when the information is then transmitted from the facsimile apparatus to the facsimile application in the PC, there is a possibility that the facsimile application will not recognize it correctly.

Accordingly, some data will not be recognized correctly at the personal computer because the AT command does not support the non-standard procedure completely.

SUMMARY OF THE INVENTION

The present invention has an object to overcome the above and other problems encountered in the aforementioned art.

It is another object of the present invention to provide a facsimile apparatus capable of reducing uncertainty of communication with a data processing equipment.

The above mentioned objects of the present invention are achieved by a facsimile apparatus connected to a data processing equipment having a facsimile application including, a communication control unit having a modem for communicating to a remote terminal by communication line, a memory for storing data received from the remote terminal, an interface device connected to the data processing equipment for converting input and output signals to communicate to the data processing equipment, a controller for communicating with the data processing equipment by AT command and converting the stored data, wherein the controller sends the data to the data processing equipment through the interface device by AT command after converting the stored data.

BRIEF DESCRIPTION OF THE DRAWINGS

Other objects and further features of the present invention will become apparent from the following detailed description when read in conjunction with the accompanying drawings, wherein:

FIGS. 3a and 3b are schematic diagrams showing a data receiving and transmitting flow of a facsimile apparatus in FIG. 2.

FIGS. 5a and 5b are flow charts for explaining a communication control operation according to the present invention.

DESCRIPTION OF THE PREFERRED EMBODIMENT

A description will now be given of preferred embodiments according to the present invention.

Figure 1:
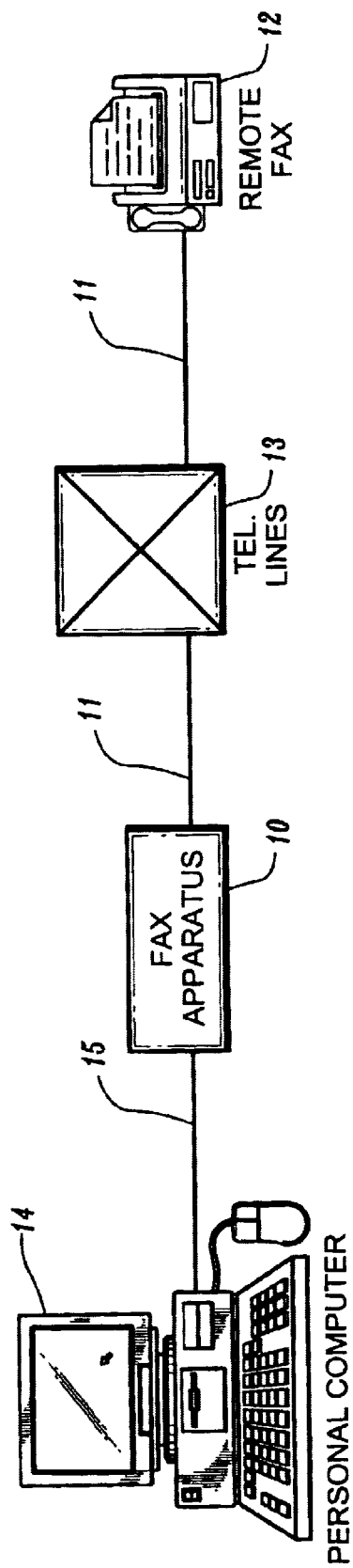
FIG. 1 is a block diagram schematically showing a system structure including a facsimile apparatus according to an embodiment of the present invention.

FIG. 1 is a block diagram schematically showing a system structure including a facsimile apparatus according to an embodiment of the present invention.

In FIG. 1, the facsimile apparatus 10 is connected with a remote facsimile apparatus 12 through an exchange 11 by telephone lines 13. Further, the facsimile apparatus 10 is connected with a personal computer 14, which has a RS232C interface, by communication cable 15.

In this embodiment, the facsimile apparatus 10 and facsimile application of the personal computer 14 communicate with AT command and class 2 command system of EIA/TIA-SP2388A standard.

When the personal computer 14 transmits facsimile data to the remote facsimile apparatus 12, the personal computer 14 uses a modem of the facsimile apparatus 10 and controls it by AT command.

On the other hand, in the case of receiving the facsimile data from the remote facsimile apparatus 12, the facsimile apparatus 10 begins with a communication with the remote facsimile apparatus 12 and stores received data in memory. If the remote facsimile apparatus 12 has full compatibility with the facsimile apparatus 10, they are able to communicate by non-standard procedure because this communication is independent of the facsimile application.

After that, the facsimile apparatus 10 transmits the stored data to the personal computer 14 according to AT command.

Of course, it is possible to connect any other type of data processing equipment including a facsimile application such as a work station, for example, to facsimile apparatus 10 instead of the personal computer 14.

Figure 2:
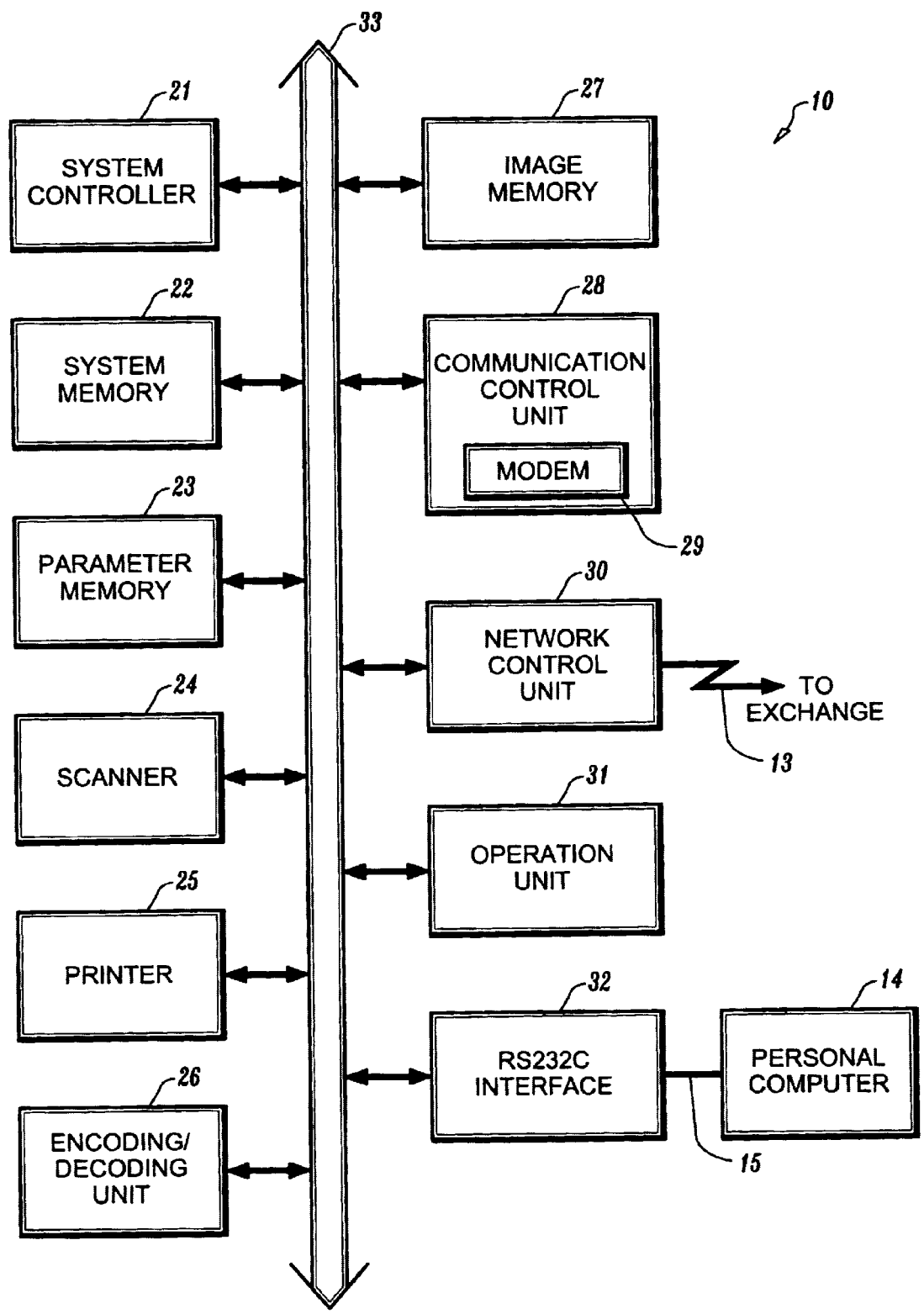
FIG. 2 is a block diagram showing a facsimile apparatus of FIG. 1.

FIG. 2 is a block diagram showing in more detail the facsimile apparatus 10 in FIG. 1.

In FIG. 2, facsimile apparatus 10 includes a system controller 21, a system memory 22, a parameter memory 23, a scanner 24, a printer 25, an encoding/decoding unit 26, an image memory 27, a communication control unit 28, a modem 29, a network control unit 30, an operation unit 31, a RS232C interface 32, and an internal bus 33.

The system controller 21 controls an entire system of the facsimile apparatus 10 according to the control programs stored in system memory 22 and parameter data stored in parameter memory 23.

The system memory 22 stores the control programs to be performed by the system controller 21 including a communication program corresponding to the AT command. The parameter memory 23 stores various kinds of parameters and information specific to the facsimile apparatus 10, and has a working memory area used by the system controller 21.

The scanner 24 reads the document and outputs the image data. The printer 25 prints out the image data on the recording sheet. The encoding/decoding unit 26 compresses the image data for the transmission operation, and decodes compressed data back into the image data.

The image memory 27 stores the compressed image data to be transmitted and the received data from the remote facsimile apparatus 12. The communication control unit 28 controls the data communication control procedure including group 3 standard procedure and non-standard procedure and includes a modem 29. The modem 29 performs functions of the group 3 facsimile and includes a low-speed modem function, such as a V.21 modem, for transmitting and receiving communication protocols and a high-speed modem function, such as V.17, V.34, V.29, V.27ter modems, for mainly transmitting and receiving the image data.

The network control unit 30 controls the connection with the telephone line 13 to transmit and receive the image data. The operation unit 31 includes a display panel and some operational keys for inputting commands and parameters. The RS232C interface 32 has a RS232C port to connect the facsimile apparatus 10 to the personal computer 14 by communication cable 15.

The internal bus 33 is connected to the system controller 21, system memory 22, parameter memory 23, scanner 24, printer 25, encoding/decoding unit 26, image memory 27, communication control unit 28, network control unit 30, operation unit 31, RS232C interface 32 and allows communication between the units therethrough.

Next, a description will be given of an image data receiving and transmitting flow by reference to FIGS. 3a and 3b.

FIG. 3a shows a data receiving flow of the facsimile apparatus 10.

In FIG. 3a, the network control unit 30 receives image data from the remote facsimile apparatus 12 via telephone line 13. The received data is converted from an analog signal to a digital signal at the modem 29 and stored in the buffer memory 29a. At this time, the image data is compressed.

After that, the stored data is outputted to the image memory 27 and encoding/decoding unit 26. The encoding/decoding unit 26 decodes the compressed data back into the image data and makes a check for errors. If errors are detected, the facsimile data is resent until it is received without the errors. The compressed image data is kept in the image memory 27.

FIG. 3b shows a data transmitting flow of the facsimile apparatus 10.

In FIG. 3b, the compressed image data in the image memory 27 is outputted to the encoding/decoding unit 26 and decoded back into the image data. The decoded image data is stored in line buffer 29b and than compressed again by encoding/decoding unit 26 according to the compression mode, which is determined based on a data communication control procedure used between the communication control unit 28 and facsimile application.

After that, the compressed image data is outputted to the buffer memory 29a. The buffer memory adjusts an I/O speed between the facsimile apparatus 10 and personal computer 14 and outputs the compressed image data to the RS232C interface 32. The RS232C interface 32 converts parallel data to serial data and transmits it to the personal computer 14 via communication cable 15.

In such a manner, if the facsimile apparatus 10 performs a memory reception, the communication between the facsimile apparatus 10 and remote facsimile apparatus 12 does not have any dependence on the function of the facsimile application. Accordingly, it is possible to perform a variety of high-performance communications including a TSI signal with an alphabet character.

Next, a description will be given of a data communication control procedure between the facsimile application and facsimile apparatus according to the present invention, by referring to FIG. 4.

Figure 4:
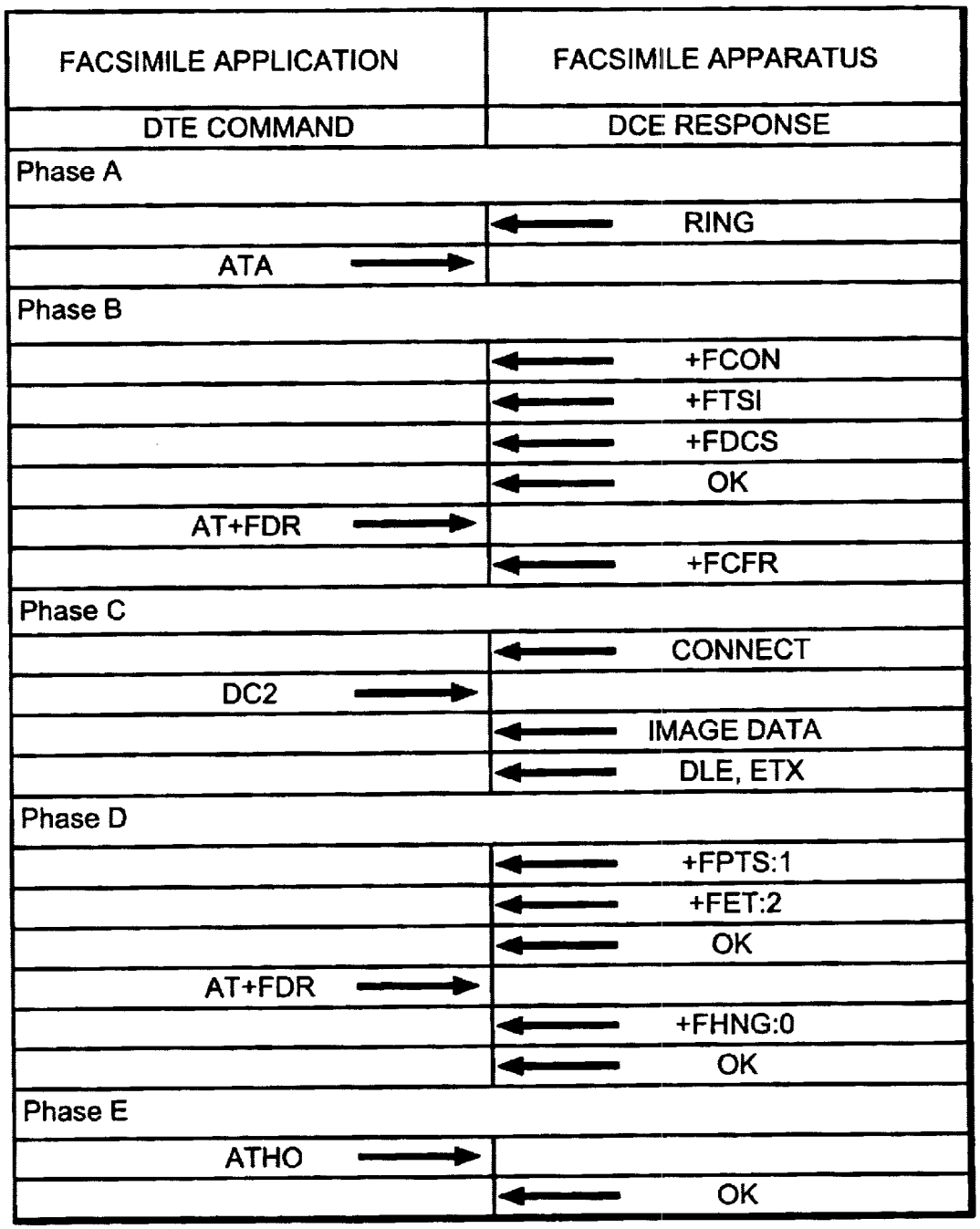
FIG. 4 shows a data communication control procedure between a facsimile application and facsimile apparatus in FIG. 2.

In FIG. 4, column DTE COMMAND shows AT command which is transmitted from the facsimile application to the facsimile apparatus 10 and column DCE RESPONSE shows the signals transmitted from the facsimile apparatus 10. The facsimile application carries out a receiving operation based on class 2 with a view to communicating with the remote facsimile apparatus 12 through the facsimile apparatus 10 and telephone line 13. However, in actuality, the facsimile apparatus 10 communicates with the facsimile application.

First, in phase A, the facsimile apparatus 10 transmits a RING signal to set the facsimile application in motion. The facsimile application responds to the RING signal and sends back a ATA (Answer A Call) signal after making the preparations for data reception.

Then, in phase B, the facsimile apparatus 10 transmits a +FCON (Facsimile Connection Request) signal to acknowledge receipt of a flag signal. Further, the facsimile apparatus 10 transmits a +FTSI (Report the Transmit Station ID) signal and +FDCS (Report Current Session) signal to notify the TSI signal and DCS (Digital Command Signal) signal. After that, the facsimile apparatus 10 transmits an OK signal which means the command is carried out correctly.

The facsimile application then transmits a AT+FDR (Begin Phase C Receive Data) signal to request TCF (Training Check) check for the facsimile apparatus 10.

Corresponding with the AT+FDR signal, the facsimile apparatus 10 sends back +FCFR (Indicate Confirmation to Receive) signal to the facsimile application. The +FCFR signal means that the facsimile apparatus 10 has transmitted a result of the TCF (Training Check) check to the remote facsimile apparatus 12 by CFR (Confirmation To Receive) signal.

Next, in phase C, the facsimile apparatus 10 transmits a CONNECT signal to acknowledge receipt of a carrier from the remote facsimile apparatus 12. Then, the facsimile application transmits a DC2 signal as a request for receiving of the image data. In response to the DC2 signal, the facsimile apparatus 10 transmits the image data from the image memory 27. Following the image data, the facsimile apparatus 10 transmits a DLE signal and an ETX signal to acknowledge receipt of RTC (Return To Control) signal from the remote facsimile apparatus 12.

Next, in phase D, the facsimile apparatus 10 transmits a +FPTS:1 (Page Transfer Status) signal to acknowledge receipt of the image data from the remote facsimile apparatus 12 and a +FET:2 (Post Page Message Response) signal to acknowledge receipt of the EOP (End Of Procedure) signal from the remote facsimile apparatus 12. The facsimile apparatus 10 then transmits the OK signal which means that the command is carried out correctly.

Then, the facsimile application transmits a AT+FDR (Continue Receive Data) signal. Corresponding with the AT+FDR signal, the facsimile apparatus 10 transmits a +FHNTG:0 (Call Termination With Status) signal and OK signal.

Finally, in phase E, the facsimile application transmits a ATHO signal to direct the disconnecting of the telephone line. In response to the ATHO signal, the facsimile apparatus 10 transmits the OK signal.

In accordance with the data communication control procedure mentioned above, the facsimile apparatus 10 transmits the image data from the image memory 27 to the personal computer 14. The TSI signal is also transmitted in phase B.

The facsimile apparatus 10 and facsimile application communicate by group 3 standard procedure. Accordingly, it will be appreciated that the alphabet character code will likely not be recognized correctly by the facsimile application.

Accordingly, in this embodiment, the facsimile apparatus 10 converts the character code which is not defined by the AT commands to a code which is able to be handled by the AT command. More specifically, the system controller 21 checks the character code of the TSI signal before transmitting the TSI signal at phase B in FIG. 4. When there are some character codes other than the numeral, space and plus, the system controller 21 converts such character code to a code defined by the group 3 standard (for example, to a space code) so that it can be recognized at the facsimile application.

It is possible that the facsimile application may, in some cases, correctly recognize the character code which is not defined by the group 3 standard. It is thus possible to run tests on the ability of the facsimile application to grasp the non-recognized character code in advance.

That is to say, the facsimile apparatus 10 performs a communication with the facsimile application by AT command in test mode and transmits a test code which includes 256 characters by +FTSI signal in FIG. 4. The facsimile apparatus 10 transmits sixteen or twenty characters during each communication.

After transmitting all characters, an operator makes the personal computer 14 display or print out a result of reception and checks it in comparison with the known test code consisting of recognizable characters. When there is a disparity between the test code and result of reception, it is a non-recognized character. The operator stores that character in the parameter memory 22 by using the operation unit 31 to be used for reference data of the conversion.

Then, during actual operation, the system controller 21 compares the received character code of the TSI signal with the reference data and judges whether the received character code is recognizable by the facsimile application before transmitting the image data to the personal computer 12. When there is a non-recognized character code of the TSI signal, the system controller 21 converts it to the code defined by the group 3 standard, for example a space code, and then transmits the converted code.

On the other hand, it is possible to use information for transmitter discrimination other than the TSI signal. By way of example, the exchange 11 transmits the telephone number of the calling station by modem signal (caller ID) adhering to the ITU-T Recommendation V.23. When the called station subscribes to that service and is equipped with the caller ID function of number display, the telephone number of the calling station is transmitted from the exchange and displayed at the called station before the subscriber responds to the call.

Accordingly, for example, if the facsimile apparatus 10 subscribes to the caller ID service, it is possible to use the telephone number information instead of the TSI signal.

In such cases, when there is an incoming call to the facsimile apparatus 10 from the remote facsimile apparatus 12, the exchange 11 transmits the telephone number of the remote facsimile apparatus 12 to the facsimile apparatus 10 after receiving the primary response signal from the facsimile apparatus 10. The system controller 21 stores that information in the parameter memory 23 and stores the image data in the image memory 27. After that, the system controller 21 transmits the stored information by +FTSI signal in FIG. 4.

Figure 5B:
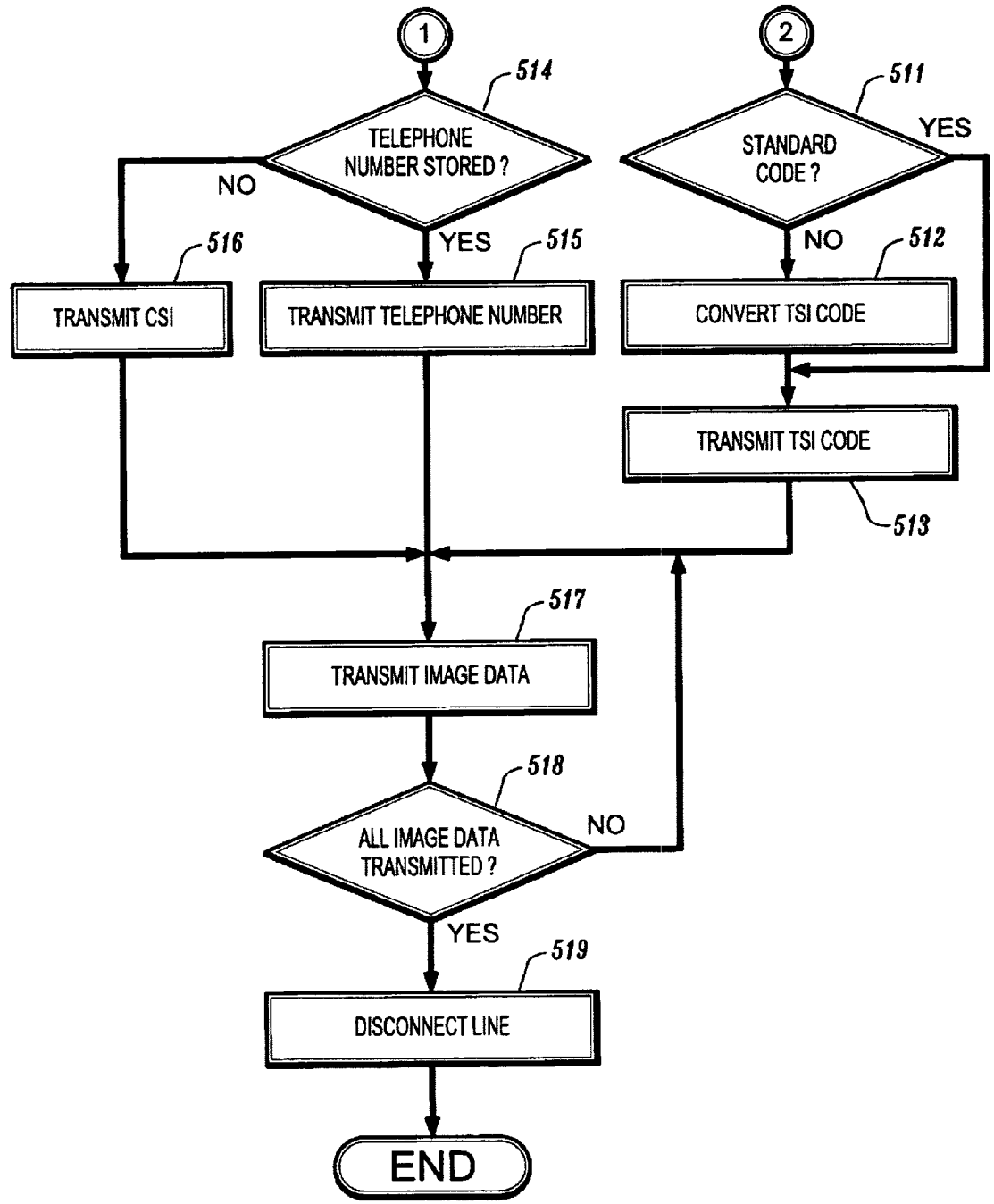

Next, a description will be given of a communication control operation according an embodiment of the present invention, by referring to FIGS. 5a and 5b.

In FIG. 5a, when there is an incoming call to the facsimile apparatus 10 from the remote facsimile apparatus 12 (Yes in step 501), the communication control unit 30 carries out a pre-transmission procedure to establish a transport connection (Step 502). The system controller 21 then stores the TSI signal transmitted from the remote facsimile apparatus 12 in the parameter memory 23 (Step 503).

On the other hand, if the facsimile apparatus 10 subscribes to the caller ID telephone number display service, the telephone number is transmitted from the exchange after the calling signal. In this case, the system controller 21 stores that information in the parameter memory 23. The stored TSI signal and the stored telephone number of the remote facsimile apparatus 12 represent remote facsimile apparatus discriminating information.

Then, the system controller 21 performs memory reception and stores the received image data in the image memory 27 (Step 504) until all image data is received (Step 505).

After all image data is received (Yes in step 505), the communication control unit 30 carries out a post-transmission procedure and disconnects the facsimile apparatus 10 from the telephone line 13 (Step 506).

Then, the system controller 21 transmits the RING signal to the personal computer 14 through the RS232C interface 32 (Step 507) and waits for the ATA signal (Step 508). When the facsimile application sends back the ATA signal (Yes in step 508), the system controller 21 checks the parameter memory 23 to transmit the remote facsimile apparatus 12 discriminating information (Step 509).

First, the system controller 21 checks whether the TSI signal is stored in the parameter memory 23 (step 510). If the TSI signal is stored (Yes in step 510), the system controller 21 checks whether there are character codes other than those defined by the group 3 standard, in the TSI signal (Step 511).

If the TSI signal includes the non-group 3 standard code (No in step 511), the system controller 21 converts such character code to the space code (Step 512) and transmits the converted TSI signal to the facsimile application by +FTSI signal in FIG. 4 (Step 513). Further, when the TSI signal does not include the non-group 3 standard code (Yes in step 511), the system controller 21 transmits the stored TSI signal to the facsimile application by +FTSI signal.

On the other hand, if the TSI signal is not stored in the parameter memory 23 (No in step 510), the system controller 21 checks whether the telephone number transmitted from the exchange 11 is stored in the parameter memory 23 (Step 514). When it is stored (Yes in step 514), the system controller 21 transmits the stored telephone number to the facsimile application by +FTSI signal in FIG. 4 (Step 515). And when it is not stored (No in step 514), the system controller 21 transmits its own CSI (Called Station Identification) which is stored in the parameter memory 23, to the facsimile application by +FTSI signal in FIG. 4 (Step 516).

In such a manner, the facsimile apparatus 10 transmits one of the TSI signal, the telephone number transmitted from the exchange 11 or its own CSI.

After that, the encoding/decoding unit 26 decodes compressed image data which is received at step 504 back into image data and compresses it again into the proper format. The re-compressed image data is transmitted to the personal computer 14 (Step 517) until all image data is transmitted (Step 518). After all image data is transmitted (Yes in step 518), the communication control unit 28 terminates the communication and disconnects the facsimile apparatus 10 from the communication cable 15 (Step 519).

As a matter of course, it is possible to modify the above-described embodiment. For example, it is possible to carry out the above mentioned test automatically by sending back the result of reception to the facsimile apparatus 10. That is, when the TSI signal is received at the PC, if the facsimile application can not recognize codes therein, the facsimile application will send that information back to the facsimile apparatus 10 so that facsimile apparatus 10 can replace the non recognizable codes with recognizable codes.

Further, it is possible to initially try to transmit the TSI signal received from the remote facsimile apparatus 12 without checking and converting, because the facsimile application may in some cases be capable of recognizing the character code which is not defined by the group 3 standard.

Furthermore, it is possible to make it user-selectable whether to perform the above mentioned conversion, by the key operation of operation unit 31.

Furthermore, it is possible to store a recognized character in the parameter memory 22 for use as reference data of the conversion on the basis of the test communication.

The present document incorporates by reference the entire contents of Japanese priority document, 09-189590 filed in Japan on Jul. 15, 1997.

Numerous modifications and variations of the present invention are possible in light of the above teachings. It is therefore to be understood that within the scope of the appended claims, the invention may be practiced otherwise than as specifically described herein.

What is claimed is:

1. A facsimile apparatus connected to a data processing equipment having a facsimile application, said apparatus comprising:

a communication control unit having a modem for communicating to a remote terminal by communication line;

a memory connected to said communication control unit for storing data received from said remote terminal via said modem;

an interface device connected to said data processing equipment for converting input and output signals to communicate to said data processing equipment; and a controller connected to and communicating with said data processing equipment by AT command and prior to communicating the stored data received from said remote terminal to the data processing equipment, for checking a character code of the stored data received from said remote terminal to determine whether the character code of the stored data is compatable with the AT command and when it is determined that the stored data includes one or more character codes not compatable with the AT command, converting the noncompatable character codes to character codes compatable with the AT command, wherein said controller sends the data to said data processing equipment through said interface device by the AT command after converting, so that the data can be communicated from the facsimile apparatus to the data processing equipment regardless of a type of procedure used to communicate the data from said remote terminal to the facsimile apparatus.

2. A facsimile apparatus according to claim 1, wherein said controller converts stored data which is not recognizable by the facsimile application.

3. A facsimile apparatus according to claim 2, wherein said stored data includes a transmitter discrimination signal of said remote terminal.

4. A facsimile apparatus according to claim 3, wherein said transmitter discrimination signal is represented by at least one character code.

5. A facsimile apparatus according to claim 3, wherein said stored data includes a TSI signal.

6. A facsimile apparatus according to claim 2, further comprising:

a data memory for storing reference data used to judge whether the stored data is recognizable by the facsimile application, wherein said controller further compares the stored data with the reference data and converts the stored data when it judges the facsimile application can not recognize the stored data.

7. A facsimile apparatus according to claim 1, wherein said controller converts stored data which is not defined in group 3 standard procedure.

8. A facsimile apparatus according to claim 7, wherein said stored data includes a transmitter discrimination signal of said remote terminal.

9. A facsimile apparatus according to claim 7, wherein said controller converts to a predetermined code which is defined in the group 3 standard procedure.

10. A facsimile apparatus as recited in claim 1, wherein said controller checks the character code of a TSI signal of the stored data received from the remote terminal to determine whether character codes of the stored data is compatible with the AT command.

11. A facsimile apparatus connected to a data processing equipment having a facsimile application, said apparatus comprising:
a communication control unit having a modem for communicating to a remote terminal by communication line;
a storage device connected to said communication control unit for storing a calling terminal's identifying information identifying the calling terminal sent from an exchange via said modem before facsimile communication;
an interface device connected to said data processing equipment for converting input and output signals to communicate to said data processing equipment; and
a controller connected to and communicating with said data processing equipment by AT command,
wherein said controller sends the calling terminal's identifying information to said data processing equipment through said interface device by AT command when the calling terminal's identifying information is stored and sending identification information identifying the facsimile apparatus when the calling terminal's identification information is not stored.

12. A facsimile apparatus according to claim 11, further comprising a memory for storing data received from said remote terminal,
wherein said controller further checks whether there is received data in said memory and sends the calling terminal identifying information when there is not received data in said memory.

13. A facsimile apparatus according to claim 12, wherein said controller further converts the stored data and sends the data to said data processing equipment through said interface device by AT command after converting the stored data.

14. A facsimile apparatus according to claim 13, wherein said controller converts the stored data which is not recognizable by the facsimile application.

15. A facsimile apparatus according to claim 14, wherein said stored data includes a transmitter discrimination signal of said remote terminal.

16. A facsimile apparatus according to claim 15, wherein said transmitter discrimination signal is represented by character code.

17. A facsimile apparatus according to claim 13, further including a data memory for storing a reference data used to judge whether the stored data is recognizable by the facsimile application,
wherein said controller further compares the stored data with the reference data and converts the stored data when it judges the facsimile application does not recognize the stored data.

18. A facsimile apparatus according to claim 12, wherein said controller converts the stored data which is not defined in group 3 standard procedure.

19. A facsimile apparatus according to claim 18, wherein said stored data includes a transmitter discrimination signal of said remote terminal.

20. A facsimile apparatus according to claim 18, wherein said stored data includes a TSI signal.

21. A facsimile apparatus according to claim 18, wherein said controller converts to a predetermined code which is defined in group 3 standard procedure.

22. A facsimile apparatus connected to a data processor having a facsimile application, said apparatus comprising:
communication means for communicating to a remote terminal by communication line;
memory means for storing data received from said remote terminal;
interface means for converting input and output signals to communicate to said data processor;
communication control means for communicating with said data processor by AT command; and
converting means prior to communicating the stored data received from said remote terminal to the data processing equipment, for checking a character code of the stored data received from said remote terminal to determine whether the character code of the stored data is compatable with the AT command and when it is determined that the stored data includes one or more character codes not compatable with the AT command converting the noncompatable character codes to character codes compatable with the AT command,
wherein said communication control means sends the data to said data processor through said interface means by the AT command after converting, so that the data can be communicated from the facsimile apparatus to the data processing equipment regardless of a type of procedure used to communicate the data from said remote terminal to the facsimile apparatus.

23. A facsimile apparatus according to claim 22, wherein said converting means converts stored data which is not recognizable by the facsimile application.

24. A facsimile apparatus according to claim 23, wherein said stored data includes a transmitter discrimination signal of said remote terminal.

25. A facsimile apparatus according to claim 24, wherein said transmitter discrimination signal is represented by at least one character code.

26. A facsimile apparatus according to claim 24, wherein said transmitter discrimination signal includes a TSI signal.

27. A facsimile apparatus according to claim 22, wherein said converting means converts stored data which is not defined in group 3 standard procedure.

28. A facsimile apparatus according to claim 27, wherein said stored data includes a transmitter discrimination signal of said remote terminal.

29. A facsimile apparatus according to claim 27, wherein said converting means converts to a predetermined code which is defined in the group 3 standard procedure.

30. A facsimile apparatus according to claim 22, further comprising
data memory means for storing reference data; and
comparing means for comparing the stored data with the reference data to judge whether the stored data is recognizable by the facsimile application,
wherein said converting means converts the stored data when said comparing means judges the facsimile application can not recognize the stored data.

31. A facsimile apparatus as recited in claim 22, wherein said converting means checks the character code of a TSI signal of the stored data received from the remote terminal to determine whether character codes of the stored data is compatible with the AT command.

32. A facsimile apparatus connected to a data processor having a facsimile application, said apparatus comprising:
communication means for communicating to a remote terminal by communication line;
storage means for storing a calling terminal's identifying information identifying the calling terminal sent from an exchange before facsimile communication;
interface means for converting input and output signals to communicate to said data processor; and
communication control means for communicating with said data processor by AT command,
wherein said communication control means sends the calling terminal's identifying information to said data processor through said interface means by AT command when the calling terminal's identifying information is stored and sending identification information identifying the facsimile apparatus when the calling terminal's identification information is not stored.

33. A facsimile apparatus according to claim 32, further comprising:
memory means for storing administration data received from said remote terminal; and
checking means for checking whether administration data is stored in said memory means,
wherein said communication control means sends the calling terminal's identifying information when the administration data is not stored in said memory means.

34. A facsimile apparatus according to claim 33, further comprising:
converting means for converting the administration data, wherein said communication control means sends the administration data to said data processor after converting the administration data when there is administration data stored in said memory means.

35. A facsimile apparatus according to claim 34, wherein said converting means converts the administration data which is not recognizable by the facsimile application.

36. A facsimile apparatus according to claim 35, wherein said administration data includes a transmitter discrimination signal of said remote terminal.

37. A facsimile apparatus according to claim 36, wherein said transmitter discrimination signal is represented by at least one character code.

38. A facsimile apparatus according to claim 36, wherein said transmitter discrimination signal includes a TSI signal.

39. A facsimile apparatus according to claim 34, wherein said converting means converts the administration data which is not defined in group 3 standard procedure.

40. A facsimile apparatus according to claim 39, wherein said administration data includes a transmitter discrimination signal of said remote terminal.

41. A facsimile apparatus according to claim 39, wherein said converting means converts to a predetermined code which is defined in the group 3 standard procedure.

42. A facsimile apparatus according to claim 33, further comprising:
data memory means for storing reference data; and
comparing means for comparing the administration data with the reference data to judge whether the administration data is recognizable by the facsimile application,
wherein said converting means converts the administration data when said comparing means judges the facsimile application can not recognize the administration data.

43. A facsimile communication method for communicating to data processing equipment having a facsimile application, said method comprising:
receiving facsimile data from a remote terminal;
storing the received facsimile data;
prior to communicating the stored facsimile data received from said remote terminal to the data processing equipment, checking a character code of the stored facsimile data received from said remote terminal to determine whether the character code of the stored facsimile data is compatable with an AT command and when it is determined that the stored facsimile data includes one or more character codes not compatable with the AT command, converting the noncompatable character codes to character codes compatable with the AT command;
sending the converted data to said data processing equipment by the AT command, so that the data can be communicated from the facsimile apparatus to the data processing equipment regardless of a type of procedure used to communicate the data from said remote terminal to the facsimile apparatus.

44. A method according to claim 43, wherein said converting step comprises converting step stored data which is not recognizable by the facsimile application.

45. A method according to claim 44, wherein said stored data includes a transmitter discrimination signal of said remote terminal.

46. A method according to claim 45, wherein said transmitter discrimination signal is represented by at least one character code.

47. A method according to claim 43, wherein said converting step comprises converting step stored data which is not defined in group 3 standard procedure.

48. A method according to claim 47, wherein said stored data includes a transmitter discrimination signal of said remote terminal.

49. A method according to claim 47, wherein said converting step comprises converting to a predetermined code which is defined in the group 3 standard procedure.

50. A method according to claim 43, further comprising:
comparing the stored data with reference data to judge whether the stored data is recognizable by the facsimile application,
wherein said converting comprises converting step the stored data when the stored data is not recognizable by the facsimile application.

51. A facsimile communication method as recited in claim 43, wherein the character code of a TSI signal of the stored data received from the remote terminal is checked to determine whether character codes of the stored data is compatible with the AT command.

52. A facsimile communication method for communicating from a facsimile apparatus to data processing equipment having a facsimile application, said method comprising:
storing a calling terminal's identifying information identifying the calling terminal sent from an exchange before facsimile communication;
receiving a image data from a remote terminal;
storing the received image data;
sending the calling terminal's identifying information and stored image data to said data processing equipment by AT command when the calling terminal's identifying information is stored and sending identification information identifying the facsimile apparatus when the calling terminal's identification information is not stored.

53. A method according to claim 52, further comprising:

storing administration data received from said remote terminal; and checking whether the received administration data is stored, wherein said sending step comprises sending the calling terminal's identifying information when the administration data is not stored.

54. A method according to claim 53, further comprising: converting the stored administration data, wherein said sending step comprises sending the administration data to said data processing equipment after converting the stored administration data when the administration data is stored.

55. A method according to claim 53, wherein said converting step comprises converting the administration data which is not recognizable by the facsimile application.

56. A method according to claim 55, wherein said administration data includes a transmitter discrimination signal of said remote terminal.

57. A method according to claim 56, wherein said transmitter discrimination signal is represented by at least one character code.

58. A method according to claim 53, wherein said converting step comprises converting the administration data which is not defined in group 3 standard procedure.

59. A method according to claim 58, wherein said administration data includes a transmitter discrimination signal of said remote terminal.

60. A method according to claim 58, wherein said converting step comprises converting to a predetermined code which is defined in group 3 standard procedure.

61. A method according to claim 53, further comprising:

comparing the administration data with reference data to judge whether the administration data is recognizable by the facsimile application, wherein said converting step comprises converting the administration data when the administration data is not recognizable by the facsimile application.

62. A facsimile apparatus connected to a data processing equipment having a facsimile application, said apparatus comprising:

a communication control unit having a modem for communicating to a remote terminal by communication line;

a memory connected to said communication control unit for storing data received from said remote terminal via said modem;

an interface device connected to said data processing equipment for converting input and output signals to communicate to said data processing equipment; and a controller connected to and communicating with said data processing equipment by AT command and prior to communicating the stored data received from said remote terminal to the data processing equipment, for checking a character code of a TSI signal of the stored data received from said remote terminal to determine whether character codes of the stored data is compatable with the AT command and when it is determined that the stored data includes one or more character codes not compatable with the AT command, converting the noncompatable character codes to character codes compatable with the AT command, wherein said controller sends the data to said data processing equipment through said interface device by the AT command after converting, so that the data can be communicated from the facsimile apparatus to the data processing equipment regardless of a type of procedure used to communicate the data from said remote terminal to the facsimile apparatus.

63. A facsimile apparatus connected to a data processor having a facsimile application, said apparatus comprising:

communication means for communicating to a remote terminal by communication line;

memory means for storing data received from said remote terminal;

interface means for converting input and output signals to communicate to said data processor;

communication control means for communicating with said data processor by AT command; and converting means prior to communicating the stored data received from said remote terminal to the data processing equipment, for checking a character code of a TSI signal of the stored data received from said remote terminal to determine whether character codes of the stored data is compatable with the AT command and when it is determined that the stored data includes one or more character codes not compatable with the AT command converting the noncompatable character codes to character codes compatable with the AT command, wherein said communication control means sends the data to said data processor through said interface means by the AT command after converting, so that the data can be communicated from the facsimile apparatus to the data processing equipment regardless of a type of procedure used to communicate the data from said remote terminal to the facsimile apparatus.

64. A facsimile communication method for communicating to data processing equipment having a facsimile application, said method comprising:

receiving facsimile data from a remote terminal;

storing the received facsimile data;

prior to communicating the stored facsimile data received from said remote terminal to the data processing equipment, checking a character code of a TSI signal of the stored facsimile data received from said remote terminal to determine whether character codes of the stored facsimile data is compatable with an AT command and when it is determined that the stored facsimile data includes one or more character codes not compatable with the AT command, converting the noncompatable character codes to character codes compatable with the AT command;

sending the converted data to said data processing equipment by the AT command, so that the data can be communicated from the facsimile apparatus to the data processing equipment regardless of a type of procedure used to communicate the data from said remote terminal to the facsimile apparatus.

65. A facsimile apparatus connected to a data processing equipment having a facsimile application, said apparatus comprising:

a communication control unit having a modem for communicating to a remote terminal by communication line;

a memory connected to said communication control unit for storing data received from said remote terminal via said modem;

an interface device connected to said data processing equipment for converting input and output signals to communicate to said data processing equipment; and a controller connected to and communicating with said data processing equipment by AT command and prior to communicating the stored data received from said remote terminal to the data processing equipment, for checking a character code of a TSI signal of the stored data received from said remote terminal to determine whether the character code of the stored data is compatable with the AT command and when it is determined that the stored data includes one or more character codes not compatable with the AT command, converting the noncompatable character codes to character codes compatable with the AT command, wherein said controller sends the data to said data processing equipment through said interface device by the AT command after converting.

66. A facsimile apparatus connected to a data processor having a facsimile application, said apparatus comprising:

communication means for communicating to a remote terminal by communication line memory means for storing data received from said remote terminal;

interface means for converting input and output signals to communicate to said data processor;

communication control means for communicating with said data processor by AT command; and converting means prior to communicating the stored data received from said remote terminal to the data processing equipment, for checking a character code of a TSI signal of the stored data received from said remote terminal to determine whether the character code of the stored data is compatable with the AT command and when it is determined that the stored data includes one or more character codes not compatable with the AT command converting the noncompatable character codes to character codes compatable with the AT command, wherein said communication control means sends the data to said data processor through said interface means by the AT command after converting.

67. A facsimile communication method for communicating to data processing equipment having a facsimile application, said method comprising:

receiving facsimile data from a remote terminal;

storing the received facsimile data;

prior to communicating the stored facsimile data received from said remote terminal to the data processing equipment, checking a character code of the stored facsimile data received from said remote terminal to determine whether the character code of a TSI signal of the stored facsimile data is compatable with an AT command and when it is determined that the stored facsimile data includes one or more character codes not compatable with the AT command, converting the noncompatable character codes to character codes compatable with the AT command;

sending the converted data to said data processing equipment by the AT command.

* * * * *